May 16, 1950     C. B. LISTER     2,507,916
ELECTRONIC DEVICE FOR INDICATING SHOTS IN TARGETS
Filed Sept. 25, 1947     5 Sheets-Sheet 1
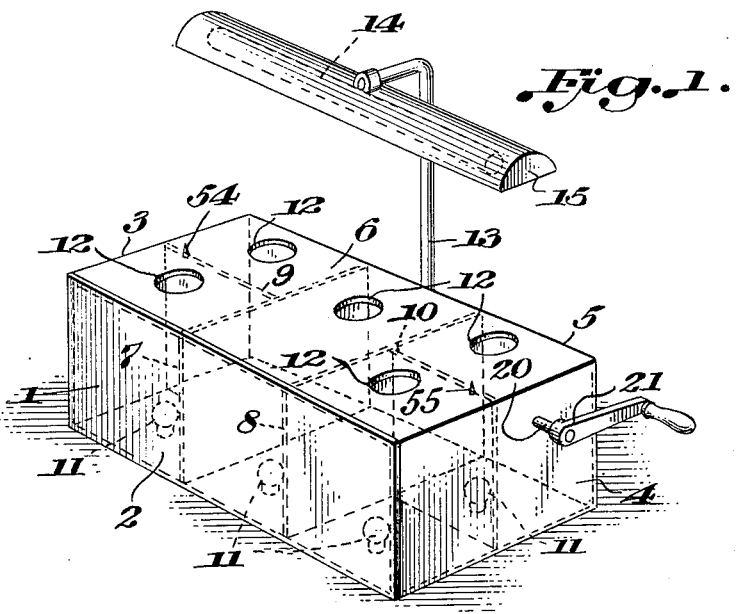
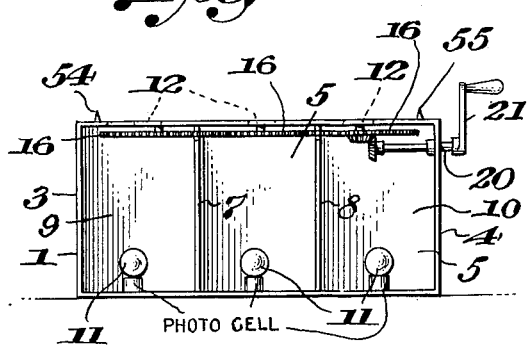
Inventor
Charles B. Lister,
By Mason & Hatfield.

May 16, 1950          C. B. LISTER          2,507,916
ELECTRONIC DEVICE FOR INDICATING SHOTS IN TARGETS
Filed Sept. 25, 1947          5 Sheets-Sheet 2
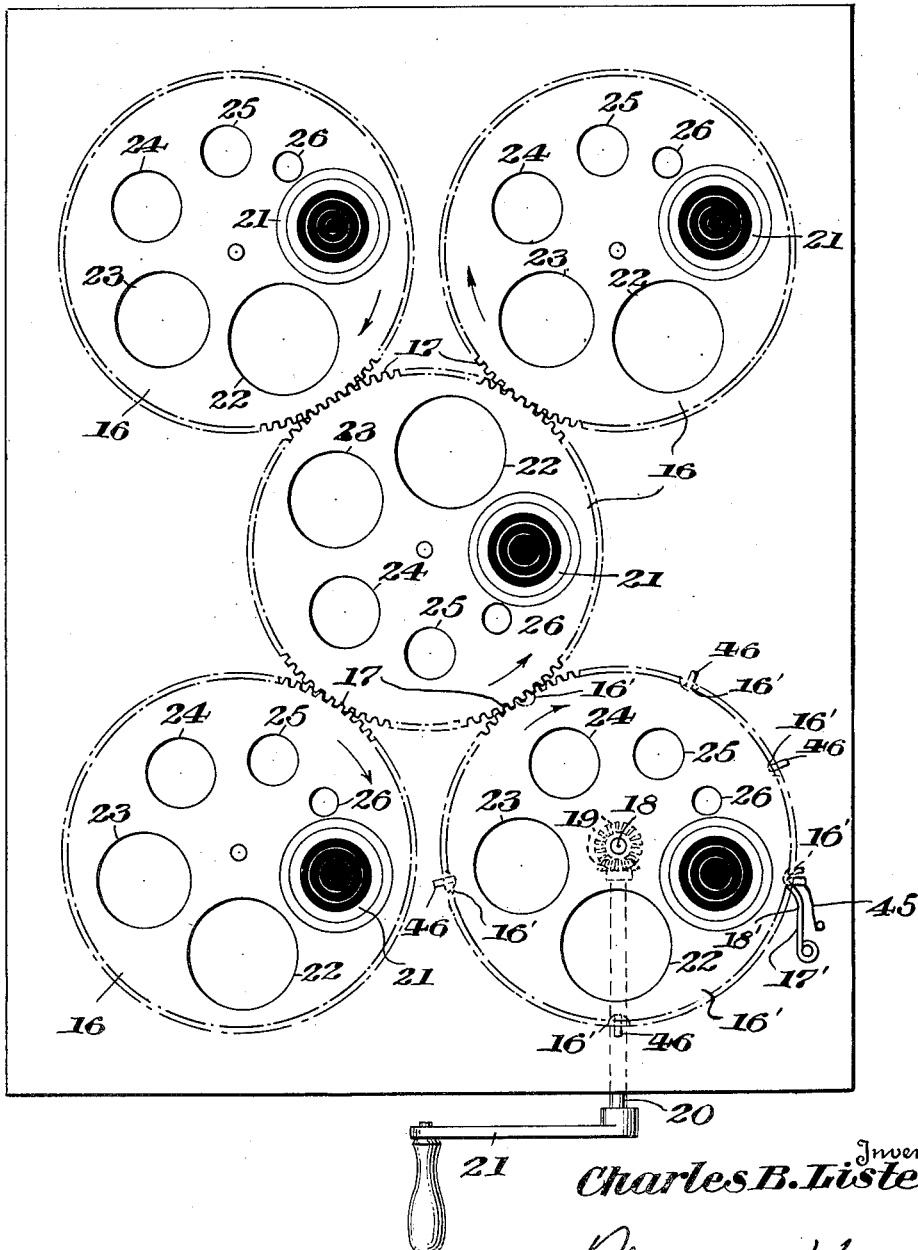

May 16, 1950  C. B. LISTER  2,507,916
ELECTRONIC DEVICE FOR INDICATING SHOTS IN TARGETS
Filed Sept. 25, 1947  5 Sheets-Sheet 3
*Fig. 13.*
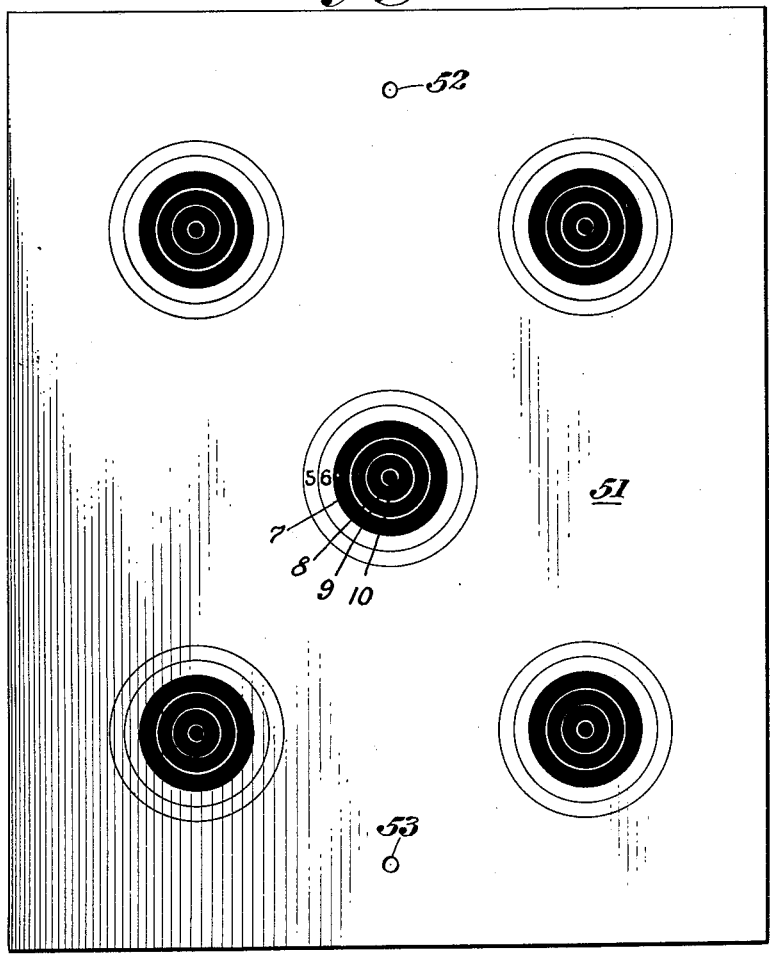
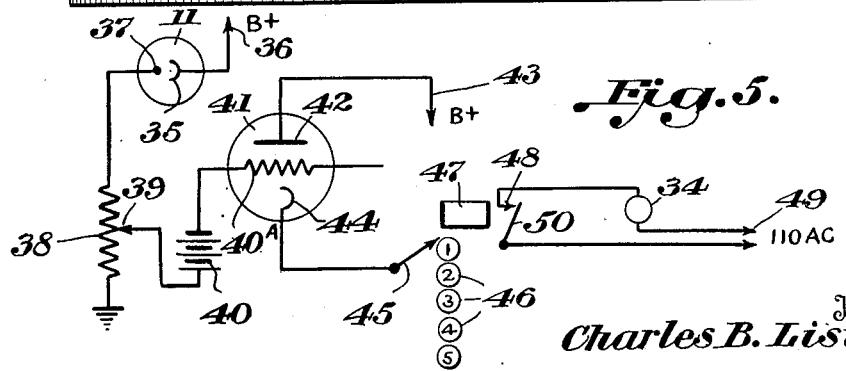
*Fig. 5.*
Charles B. Lister, Inventor
By Mason & Hatfield Inventor
Charles B. Lister
By /s/ Marno Hatfield May 16, 1950            C. B. LISTER            2,507,916
ELECTRONIC DEVICE FOR INDICATING SHOTS IN TARGETS
Filed Sept. 25, 1947            5 Sheets-Sheet 5
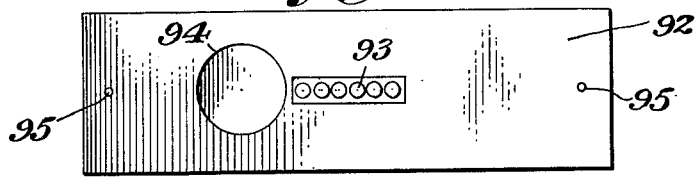
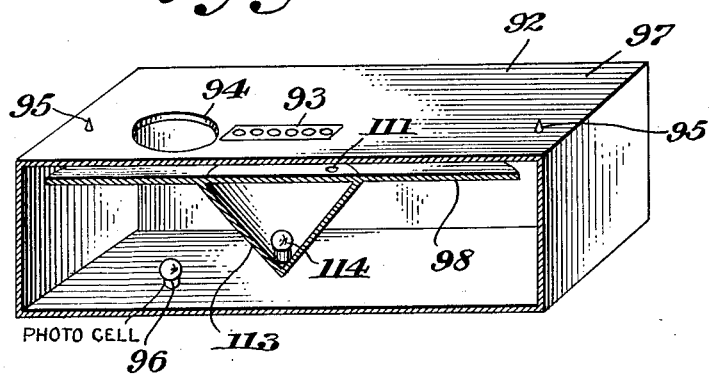
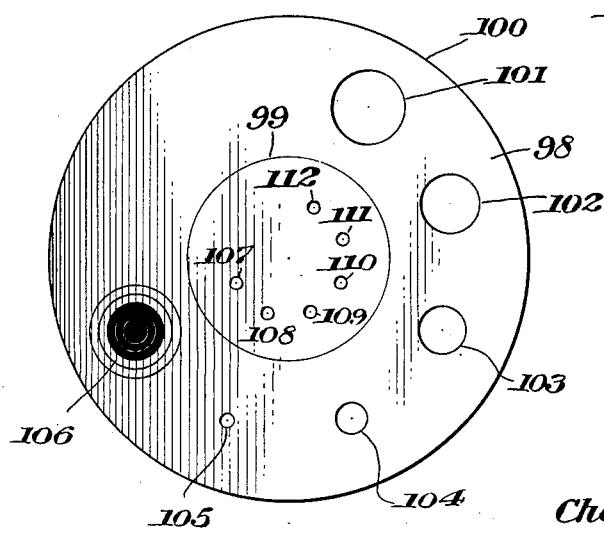
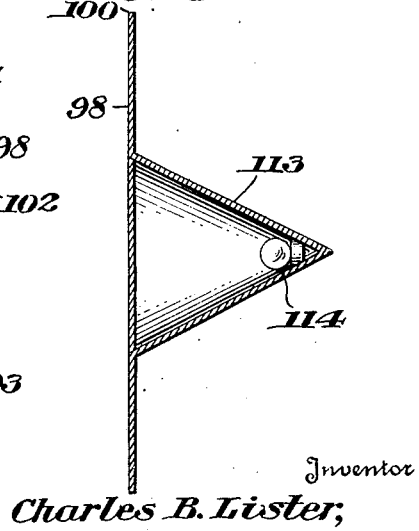
Inventor
Charles B. Lister,
By Nolan & Hatfield Patented May 16, 1950

2,507,916

UNITED STATES PATENT OFFICE 2,507,916

ELECTRONIC DEVICE FOR INDICATING SHOTS IN TARGETS

Charles B. Lister, Washington, D. C.

Application September 25, 1947, Serial No. 775,995

17 Claims. (Cl. 177—311)

This invention relates to an electronic device for indicating a plurality of shots, preferably in the same number of targets, in an accurate and expeditious manner. The invention has particular application when used to measure the accuracy of a shooter for firing a plurality of shots at a corresponding plurality of targets at a shooting gallery, pistol range, or other place where there is competition between shooters or where it is desired for practice purposes.

An object of the invention, therefore, is to provide an electronic device for measuring the position of a shot in a target by means of light sensitive means, such as a photocell.

Another object of the invention is to provide an enclosure such as a box having target positioning means for accurately positioning a sheet of paper upon which one or more targets have been printed, during the time the relative position of the shot in the target is measured by the device.

An additional object is to provide in connection with the apparatus noted in the foregoing paragraphs means for simultaneously electrically recording bullet holes in a plurality of targets.

A further object of the invention is to provide a device adapted to indicate a series of shots made in a corresponding series of targets and to indicate on a scoreboard at the shooter's stand, the shots in the target by light sensitive means.

Additional objects will be found throughout the specification.

In the drawings:

Figure 1 is a perspective view of one form of the invention;

Figure 2 is a front elevation of the box shown in Figure 1 with the front panel removed;

Figure 3 is a diagrammatic view of a plurality of discs located beneath the top of the container or box shown in Figure 1;

Figure 4 is a front elevation of a scoreboard to be used in connection with the device shown in Figure 1;

Figure 5 is a schematic wiring diagram to be used with the apparatus shown in the preceding figures;

Figure 8 is a top plan view of a third modification of a target scoring device;

Figure 9 is a side elevation of the box shown in Figure 8, with one of the sides removed.

Figure 10 is a plan view of a disc to be used with the device shown in Figures 8 and 9;

Figure 11 is a side elevation of the disc shown in Figure 10;

Figure 13 is a sheet of cardboard with five targets printed thereon, particularly suited for use with the device shown in Figure 1.

Figure 6:
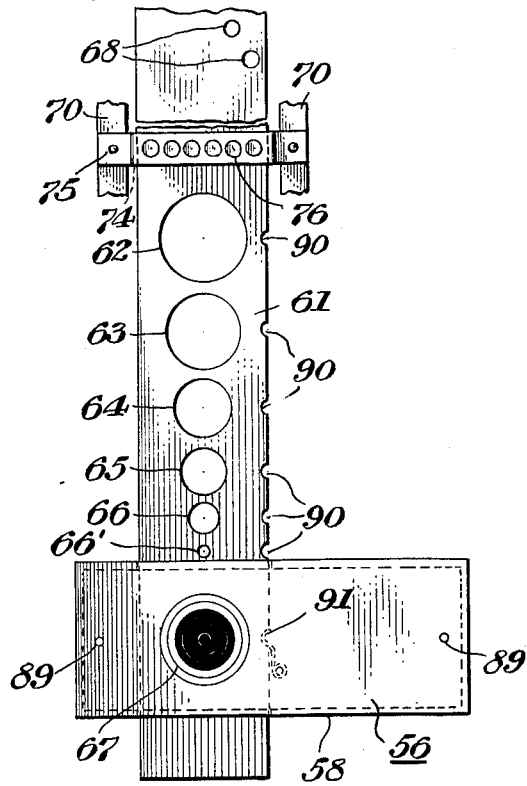
Figure 6 is a front elevational view of a modified box showing scoring box and appurtenances in diagrammatic form.

Referring to Figure 1, the numeral 1 indicates the box as a whole. The box is provided with a front 2, sides 3 and 4, a back 5 and a top 6. The interior of the box is preferably provided with two transverse partitions indicated at 7 and 8 and two lengthwise partitions shown at 9 and 10, all in dotted lines.

The partitions form five cells, in each one of which is located light sensitive means such as photoelectric tubes 11. The top of the box is provided with five circular apertures 12 corresponding in diameter to the diameter of the targets, shown in Figure 13. The apertures are positioned in an arrangement corresponding to the arrangement of targets shown in Figure 13, so that when the pieces of cardboard are positioned on the top 6 each target will be over an aperture.

Mounted on a suitable support 13 is a source of light 14 located within the reflector 15. Mounted beneath each aperture 12 are a series of rotatable discs 16, as indicated in Figure 3. The discs 16 are geared to each other as indicated at 17. The lower right hand disc as viewed in Figure 3 is provided with a vertical shaft 18 which, by means of bevel gears 19, is adapted to be rotated by the drive shaft 20 which extends through one side of the box and is provided with a handle 21 for rotating the same. When the handle is rotated, the disc driven by shaft 18 is also rotated, and by means of the gearing 17 all of the other four discs are also rotated at the same speed.

Each disc is provided with a series of openings, the largest opening 21 having a circumference of the same size as a target, or the 5-ring. The next smaller opening 22 is the size of the 6-ring; the next smaller opening 23 is the size of the 7-ring; the next smaller opening 24 is the size of the 8-ring; the next smaller opening 25 is the size of the 9-ring; and the opening 26 is the size of the 10-ring, or the bull's-eye.

As shown in Figure 4, the scoreboard 27 is provided with a column 28 giving the value which corresponds to the ring of the target on which the bullet has struck. Each of columns 29—33, inclusive corresponds to a target. Located in each of the boxes of the scoreboard are lights 34. There are five circuits identical with the circuits shown in Figure 5. As shown in that figure, the light sensitive means or photoelectric tube 11 has its anode 35 connected to a D. C. power supply 36. The cathode 37 of this tube is connected through a potentiometer 38 to ground. The potentiometer tap 39 is connected through the battery 40 to the grid 40A of a triode tube 41 having a sharp cut-off characteristic. The anode 42 of this triode goes directly to a D. C. power supply 43. The cathode 44 of the triode 41 is connected to a brush 45 which is located on each of the discs 16. Also located on the discs 16, corresponding to the holes 21—25, respectively, are contacts 46. To each of the contacts 46 there is connected a conventional A. C. relay 47. The intermittent connection 48 of the relay is connected through the light 34, which is located on the scoreboard, to an A. C. power supply 49. The other side of the power supply 49 is connected to the relay armature 50. It is to be noted that the five contacts 46 are connected to five separate relays, one side of each relay going to a contact and the other side to ground. Each of these relays contains a light 34 and these are the lights of the scoreboard representing the beforementioned values 5, 6, 7, 8, 9, and 10.

Each disc is provided with a series of notches 16', and there is a spring pressed finger 17' mounted on the under side of the box which is urged by a spring 18' toward the left, as seen in Figure 3, so that when the crank 21 is rotated each disc will rotate ⅙ of a revolution, whereupon the spring pressed finger 17', due to the urging of the spring 18', will engage one of the notches 16' and stop the disc in a position where one of the six openings is exactly positioned concentrically beneath its aperture 12.

The target sheet 51 shown in Figure 13 is provided with pin holes 52 and 53, and the box 1 is provided with pins 54 and 55.

In the operation of the device, the target sheet is placed in position for firing and the shooter fires one shot at each of the targets. The target is then removed from its shooting position and the pin holes 52 and 53 are placed over the pins 54 and 55, respectively. The crank 21 is operated so as to cause each of the discs to rotate ⅙ of a revolution, and during this time the holes 26 in each of the discs 16 come directly beneath the center of the 10-ring. If there is a shot in the bull's-eye, light from light source 14 will pass through the bullet hole in the target within the 10-ring and through the aperture 12. This light will energize the light sensitive means 11. The resistance of tube 11 will then increase and, therefore, the potential on the potentiometer 38 will decrease, permitting current to flow in the tube 41. At this time the brush 45 will be connected to the contacts 46 which are opposite to hole 10 in the discs 16. The relay 47 then operates to light the light source 34, which in turn will show on the scoreboard that shots have been registered in the 10-ring of the targets.

The foregoing has assumed that there have been five bull's-eyes placed in the targets. If only one or two bull's-eyes, or none, have been made, the crank is again operated ⅙ of a revolution to bring hole 25 beneath the 9-ring of the target. If a shot has been placed in this 9-ring, the circuit will be energized and the light corresponding to the 9-ring will be operated for that target.

The handle is next operated for another ⅙ of a revolution, and so on until all target rings have been exposed to the source of light, and if any one of these rings has been punctured by a bullet, it will be registered on the scoreboard as indicated above. When the discs have been caused to complete a revolution, the scoreboard should then indicate five hits, providing of course that shots have been made within these rings.

The following is a detailed explanation of the operation of the signals 34 when used in the aforesaid manner. The five sources 34 indicating that there has been a hit in the 10-ring of each target will remain lighted until the crank 21 is again operated. When the crank 21 is rotated the holes 26 will no longer be beneath the 10-rings of the target and therefore there will be no light passing through the 10-ring to energize the light sensitive means 11. Accordingly, the sources 34 on the scoreboard which indicate that there have been hits in the 10-rings of the targets, no longer remain energized. However, when the crank 21 has been rotated an amount sufficient to bring the holes 25 directly beneath the 9-rings of the targets, the sources 34 on the scoreboard, corresponding to the 9-rings of the targets, will be lighted in the foregoing manner provided there have been hits in the 9-rings of the targets. Upon further rotation of the crank 21, the rings 8, 7, 6 and 5 of the targets may be tested in a similar manner and, as disclosed in Figures 1 to 5 inclusive, of the drawing, the only sources 34 that are lighted on the scoreboard are the ones corresponding and indicating the results of a certain set of rings of the targets (namely either the 10, 9, 8, 7, 6 or 5 rings) under test. Of course, it is to be understood that by providing holding means for the relays each time they are energized, which is a common expedient in the art, the sources 34 will, upon being lighted due to the fact that their corresponding relays are energized, remain lighted until each of the target rings is tested. Similarly, it is an obvious and simple matter to provide suitable means for releasing all of the relays 47 from their energized state, such as a conventional switch connected to all of the armatures 50 of the relays 47. Accordingly, the scoreboard under these latter conditions will give a complete indication of the results obtained from testing each of the rings of the targets.

Figure 7:
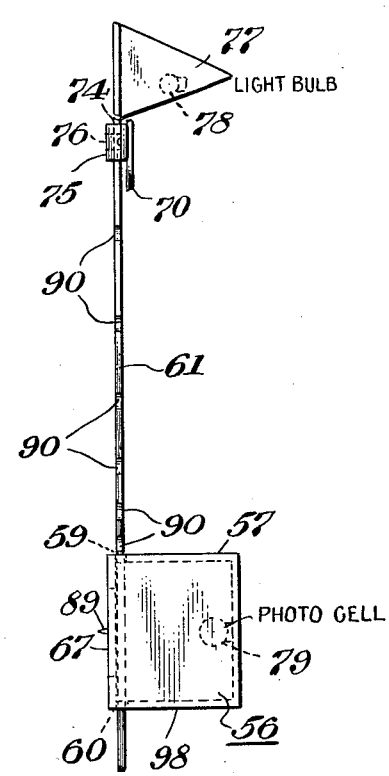
Figure 7 is a side elevation of the device shown in Figure 6.

Figures 6 and 7 illustrate a modification showing the scoring mechanism for only one target. In this construction the box is indicated at 56. The box is provided in its top 57 and bottom 58 with slots 59 and 60 for the slide 61. The slide has progressively smaller holes from top to bottom, numbered 62—66, inclusive. These correspond to the rings of the targets 67 such as shown in Figure 13. The top of the panel or slide 61 is provided with diagonally arranged apertures 68 spaced upwardly apart a distance the same as notches 90. Near the upper extremity of the panel 61 there is provided a groove 74 mounted on a stationary support 70 for the reception of a scoring board 75 fixed to a vertical support (not shown). The scoring board 75 has thereon six lens buttons 76, each positioned over a hole in panel 75 of the same size as the buttons 76.

Figure 12:
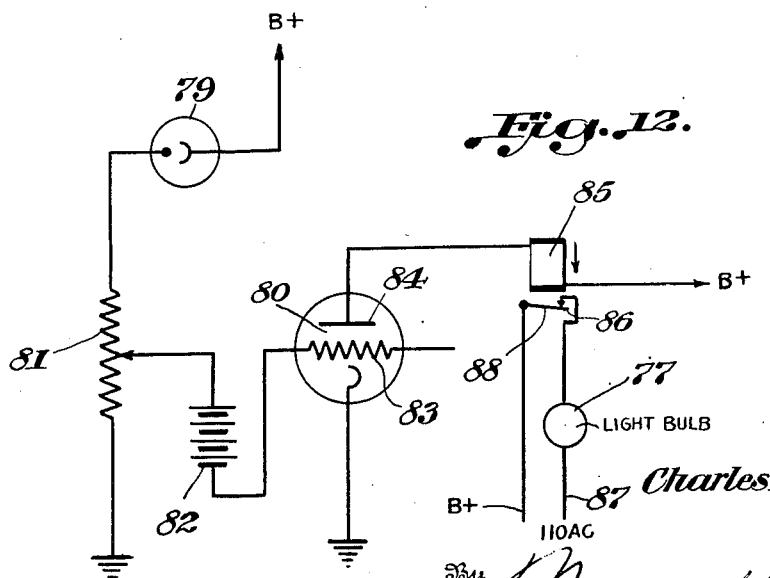
Figure 12 is a schematic wiring diagram to be used with the apparatus shown in Figures 6 through 11.

Attached to the panel 61 and directly behind all of the apertures 68 is a cone-shaped casing 77 containing therein a light source 78. In the rear of the box 56 there is a photo-electric tube 79. Referring now to the wiring diagram of Figure 12, the light sensitive cell 79 is included in a circuit similar to that shown in Figure 5 with the exception of the output circuit of the triode tube 80. In Figure 12, as is shown, there is a potentiometer 81 the tap of which is connected to a battery 82 to the grid 83 of the triode 80. The plate 84 of the triode 80 is connected to a conventional A. C. relay 85. The contact 86 of this relay is connected through the light source 78 to an A. C. supply source 87. The other side of this supply source is connected to the relay armature 88.

In operation, a target is positioned on the top of the box 56 by means of the pins 89 which are the same as those shown in Figure 1. If there has been a hit in the 10-ring of the target, light which shines on the target from light source 78 will pass through the hole 66' of the panel when the panel is slid downwardly so that the hole 66' is directly beneath the 10-ring. There are a series of notches 90 located on the margins of the panel, and these are engaged by a spring pressed finger so as to accurately position each one of the holes exactly beneath the center of the target when the panel is pushed down step by step, so that each hole will be successively positioned axially with the rings of the target. This spring pressed finger is located as shown in dotted lines at 91.

When the aperture 66' lies directly beneath the 10-ring, the corresponding aperture 68 will lie directly beneath its corresponding lens 76. Outside light will be admitted to the box interior and will energize the photocell and by means of the circuit shown in Figure 12 will operate the relay 85, thereby lighting up the light source 78 which is located in the casing 77. The light rays from source 78 will shine through the several apertures 68. However, only one of these apertures will pass light rays to any of the lenses 76. These lenses are numbered to correspond to the rings of one of the targets, as shown in Figure 13. In this illustration, one of the apertures 68 will permit light to shine through the reflector bulb 76 which corresponds to the 10-ring of the target.

Another modification is illustrated in Figures 8, 9, 10, and 11. In Figure 9 the numeral 92 represents a box similar to the box shown in Figure 6. Mounted on the front side of this box is a scoring panel containing lenses 93 that are mounted similar to the lenses 76 of Figure 6. Also mounted on the front face of the box 92 is a hole 94 corresponding to one of the targets shown in Figure 13. A pair of pin supports 95 are mounted on the face of the box in a manner similar to the arrangement of pins 89 on the box 56, shown in Figure 6. Figure 9 shows a perspective view of the box 92 having mounted therein on its lower face a light sensitive means 96. Also mounted within this box and closely aligned parallel to the upper face 97 of the box 92 is a disc 98 which will hereinafter be described.

Figure 10 shows the disc 98 having an inner circle 99 and an outer circle 100. Mounted within these circles are a plurality of graduated holes which correspond to the target rings shown in Figure 13, these holes being numbered 101 through 106. Within the inner circle 99 of the disc there is provided a plurality of apertures 107 through 112 which are radially aligned with the corresponding graduated holes 101 through 106.

A side view of the disc is shown in Figure 11. A casing 113 is attached behind the disc 98 and extends around the circle 99. Mounted within the casing is a light source 114 similar to the light source shown in the circuit in Figure 12. The circuit which is connected to the light sensitive means 96 is similar, in both operation and structure, to the circuit shown in Figure 12 and, therefore, will not be described in detail.

The apertures 107 through 112 are directly beneath the upper face of the box 97 so that when the disc is rotated (by means similar to that shown in Figure 1) one of the apertures is directly beneath one of the lenses 93. The disc is provided with a notch and a spring pressed finger similar to that shown in Figure 3.

In operation, a target (similar to the one heretofore shown) is placed upon the top of the box and accurately aligned by means of the pins 95. The disc is rotated in a manner similar to that described above. Assuming that there is a hit in the 9-ring and the disc has been rotated to place the 9-ring directly beneath the 9-ring of the target, light will pass through the hole 94 and the hit in the 9-ring and operate the light sensitive circuit. When the light source 114 is illuminated, light passes through the apertures 107-112, inclusive. At this time the aperture 108 is positioned directly beneath one of the lenses 93 (representing 9-ring of the target). The lens will receive the light from the scoreboard and indicate that a hit has been made in the 9-ring of the target.

There are various modifications which will come within the scope and spirit of this invention. For instance, there could be located within the partitions 6 of Figure 1 six photocells positioned so as to be energized whenever light passes through any one of the six rings, and wiring would lead directly from each cell which would complete a circuit to a light source located on the scoring board. Likewise, recording means could be operated by using a number of mirrors arranged so that they would reflect the light passing through the holes in the target rings to a photocell located beneath each target.

It will be understood that changes may be made to the structure shown therefor, provided they come within the scope of the appended claims.

I claim:

1. In an electronic device for indicating shots in a target, a container, said container having at least one aperture, a light sensitive means in said container, a member, means movably mounting said member on said container, said member being provided with a plurality of graduated apertures, means for progressively moving the apertures of said member in line with the aperture in said container, means for positioning a target above the aperture in said container and means including said light sensitive means for indicating the position of a hole in said target.

2. In an electronic device for indicating shots in a target, a container, said container having at least one aperture, a light sensitive means in said container, a member, means movably mounting said member on said container, said member being provided with a plurality of graduated apertures, means for progressively moving the apertures of said member in line with the aperture in said container, means for positioning a target above the aperture in said container, indicating means including a circuit, said circuit including said light sensitive means, amplifying means in said circuit, a relay in said circuit, and an indicating light source in said circuit.

3. In an electronic device for indicating shots in a target, a container, said container having at least one aperture, a light sensitive means in said container, a member, means movably mounting said member on said container, said member being provided with a plurality of graduated apertures, means for progressively moving the apertures of said member in line with the aperture in said container, means for positioning a target above the aperture in said container, indicating means including a circuit, said circuit including said light sensitive means, amplifying means in said circuit, a relay in said circuit, an indicating light source in said circuit, and scoreboard means, said light source being positioned on said scoreboard.

4. In an electronic device for indicating shots in a target, a container, said container having at least one aperture, a light sensitive means in said container, a member, means movably mounting said member on said container, said member being provided with a plurality of graduated apertures, means for progressively moving the apertures of said member in line with the aperture in said container, means for positioning a target above the aperture in said container, said movable member comprising a panel, and indicating means on said panel.

5. In an electronic device for indicating shots in a target, a container, said container having at least one aperture, a light sensitive means in said container, a member, means movably mounting said member on said container, said member being provided with a plurality of graduated apertures, means for progressively moving the apertures of said member in line with the aperture in said container, means for positioning a target above the aperture in said container, said movable member comprising a panel, and indicating means on said panel, said indicating means including a scoring means.

6. In an electronic device for indicating shots in a target, a container, said container having at least one aperture, a light sensitive means in said container, a member, means movably mounting said member on said container, said member being provided with a plurality of graduated apertures, means for progressively moving the apertures of said member in line with the aperture in said container, means for positioning a target above the aperture in said container, said movable member comprising a panel, and indicating means on said panel, said indicating means including a scoring means, said scoring means comprising a series of reflector buttons.

7. In an electronic device for indicating shots in a target, a container, said container having at least one aperture, a light sensitive means in said container, a member, means movably mounting said member on said container, said member being provided with a plurality of graduated apertures, means for progressively moving the apertures of said member in line with the aperture in said container, means for positioning a target above the aperture in said container, said movable member comprising a panel, and indicating means on said panel, said indicating means including a scoring means, said scoring means comprising a series of reflector buttons, said panel having a series of apertures corresponding to said reflector buttons.

8. In an electronic device for indicating shots in a target, a container, said container having at least one aperture, a light sensitive means in said container, a member, means movably mounting said member on said container, said member being provided with a plurality of graduated apertures, means for progressively moving the apertures of said member in line with the aperture in said container, means for positioning a target above the aperture in said container, said movable member comprising a panel, indicating means on said panel, said indicating means including a scoring means, said scoring means comprising a series of reflector buttons, said panel having a series of apertures corresponding to said reflector buttons, and means adapted to engage said panel whereby to accurately position one of said graduated apertures axially beneath said container aperture.

9. In an electronic device for indicating shots in a target, a container, said container having at least one aperture, a light sensitive means in said container, a member, means movably mounting said member on said container, said member being provided with a plurality of graduated apertures, means for progressively moving the apertures of said member in line with the aperture in said container, means for positioning a target above the aperture in said container, said movable member comprising a panel, and indicating means on said panel, said container having aligned slots for slidably supporting said panel.

10. In an electronic device for indicating shots in a target, a container, said container having at least one aperture, a light sensitive means in said container, a member, means movably mounting said member on said container, said member being provided with a plurality of graduated apertures, means for progressively moving the apertures of said member in line with the aperture in said container, means for positioning a target above the aperture in said container, said movable member comprising a panel, and indicating means including a light source on said panel, said light source being positioned in a cone mounted on said panel.

11. In an electronic device for indicating shots in a target, a container, said container having at least one aperture, a light sensitive means in said container, a member, means movably mounting said member on said container, said member being provided with a plurality of graduated apertures, means for progressively moving the apertures of said member in line with the aperture in said container, means for positioning a target above the aperture in said container, said movable member comprising a panel, and indicating means on said panel, said indicating means including a scoring means and a light source, said scoring means comprising a series of reflector buttons, said panel having a series of apertures corresponding to said reflector buttons, a cone mounted on said panel, said light source being mounted in said cone, said cone being mounted behind said panel apertures.

12. In an electronic device for indicating shots in a target, a container, said container having at least one aperture, a light sensitive means in said container, a member, means movably mounting said member on said container, said member being provided with a plurality of graduated apertures, means for progressively moving the apertures of said member in line with the aperture in said container, means for positioning a target above the aperture in said container, indicating means, said indicating means including a circuit, said circuit including amplifying means, a relay, and a light source, said light source being adapted to indicate the position of a shot in said target.

13. In an electronic device for indicating shots in a target, a container, said container having at least one aperture, a light sensitive means in said container, a member, said member being provided with a plurality of graduated apertures forming outer apertures, means for progressively moving the apertures of said member in line with the aperture in said container, means for positioning a target above the aperture in said container, said light sensitive means being positioned to be actuated by light passing through one of the rings in said target, said member having a plurality of inner apertures, each inner aperture being radially aligned with an outer aperture, indicating means including a scoring means and a circuit extending from said light sensitive means to said indicating means, said scoring means comprising a series of reflector buttons, said inner apertures adapted to be progressively moved in line with one of said buttons.

14. In an electronic device for indicating shots in a target, a container, said container having at least one aperture, a light sensitive means in said container, a disc having a plurality of graduated apertures movably mounted on said container, means for progressively moving the apertures of said disc in line with the aperture in said container, means for positioning a target above the aperture in said container, and means including a light source associated with said light sensitive means for indicating a hole in said target, said light sensitive means being positioned to be actuated by light passing through said target.

15. In an electronic device for indicating shots in targets, a container, light sensitive means in said container, a plurality of members mounted on said container, a plurality of apertures in said container with one member positioned beneath each aperture in the container, said members being provided with a plurality of graduated apertures, means for simultaneously rotating said members whereby one of the apertures of each of said members is in line with one of each of the apertures in said container, means for positioning a target above each aperture in said container and means for indicating the position of a hole in said target including said light sensitive means.

16. In an electronic device for indicating shots in targets, a container, light sensitive means in said container, a plurality of members mounted on said container, a plurality of apertures in said container with one member positioned beneath each aperture in the container, said members being provided with a plurality of graduated apertures, means for simultaneously rotating said members whereby one of the apertures of each of said members is in line with one of each of the apertures in said container, means for positioning a target above each aperture in said container, said container having a plurality of partitions forming compartments therein, said light sensitive means including a photoelectric cell in each of said compartments, a circuit connected to each of said light sensitive means, said circuit including amplifying means, a relay, and a light source, and a scoreboard, and means for mounting the light source of each circuit on said scoreboard.

17. In an electronic device for indicating shots in a target, an enclosure having an aperture therein above which a target may be positioned, a member provided with a plurality of graduated apertures movably mounted in said enclosure, means for moving a selected one of said graduated apertures in line with the enclosure aperture, light sensitive means in said enclosure and means including said light sensitive means for indicating the position of a shot in said target.

CHARLES B. LISTER.

REFERENCES CITED

The following references are of record in the file of this patent:

UNITED STATES PATENTS

| Number | Name | Date |
|---|---|---|
| 1,072,152 | Ocampo | Sept. 2, 1913 |
| 1,925,355 | Whitson | Sept. 5, 1933 |
| 2,266,779 | Loughridge et al. | Dec. 23, 1941 |
| 2,337,535 | Acs, Jr. | Dec. 28, 1943 |